United States Patent
Tanaka et al.

[11] 3,930,622
[45] Jan. 6, 1976

[54] ENERGY STORING SAFETY BELT RETRACTOR

[75] Inventors: Akira Tanaka, Northridge; Avraham Ziv, Sepulveda, both of Calif.

[73] Assignee: American Safety Equipment Corporation, Encino, Calif.

[22] Filed: June 13, 1974

[21] Appl. No.: 478,841

[52] U.S. Cl. .......................................... 242/107.4
[51] Int. Cl.² ................................... B65H 75/48
[58] Field of Search .......... 242/107.4, 107 SB, 107; 280/150 SB

[56] References Cited
UNITED STATES PATENTS

| | | | |
|---|---|---|---|
| 3,659,800 | 5/1972 | Meyer | 242/107.4 |
| 3,722,824 | 3/1973 | Hayashi | 242/107.4 |
| 3,819,126 | 6/1974 | Stoffel | 242/107.4 |

Primary Examiner—Leonard D. Christian
Attorney, Agent, or Firm—Poms, Smith, Lande & Glenny

[57] ABSTRACT

In an emergency locking safety belt retractor, a locking bar is operated by inertia responsive means which includes an inertia responsive mass and a locking bar for locking with teeth of the ratchet wheel associated with the belt winding wheel of the retractor. The inertia responsive means has been improved by the provision of having resilient means in force transmitting relation between the lock bar and the mass for receiving and storing energy imparted thereto by movement of the mass and for thereby urging the lock bar toward locking engagement with the ratchet wheel through a pawl bounce condition. The pawl bounce condition is defined as the condition that occurs when the lock bar initially bounces off the tooth of the lock wheel before attaining a locking engagement with the wheel. The resilient means may take the form of several different embodiments. In one embodiment, an actuator is mounted between the mass and the lock bar. A resilient stem is connected between the mass and the actuator, and the resilient stem may either be a spring wire or a coil spring. In another embodiment, the resilient means is mounted between the actuator and the lock bar and may either take the form of a diaphragm or a elastomeric material which absorbs energy in either stretching or compressing, or it may comprise a spring mounted on the lock bar for engagement with the actuator to absorb energy from the lock bar to the actuator.

20 Claims, 10 Drawing Figures

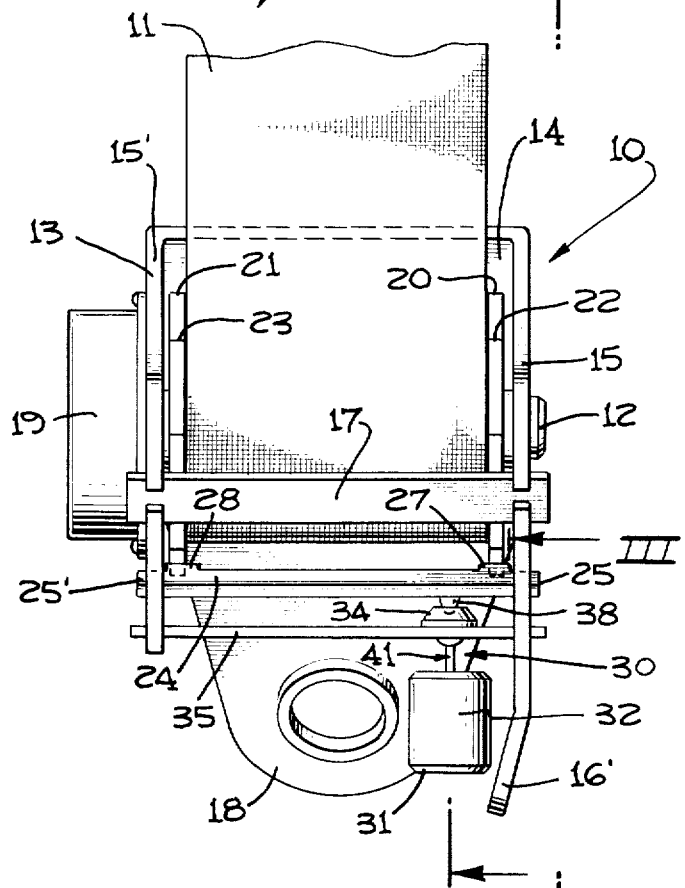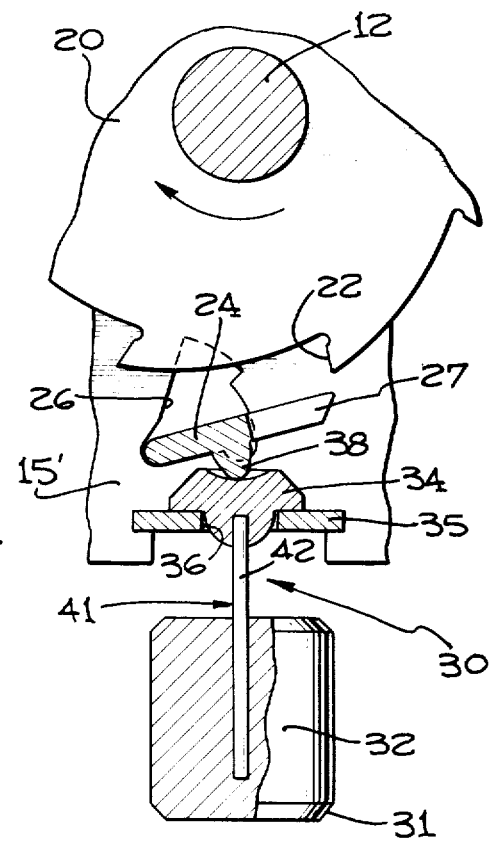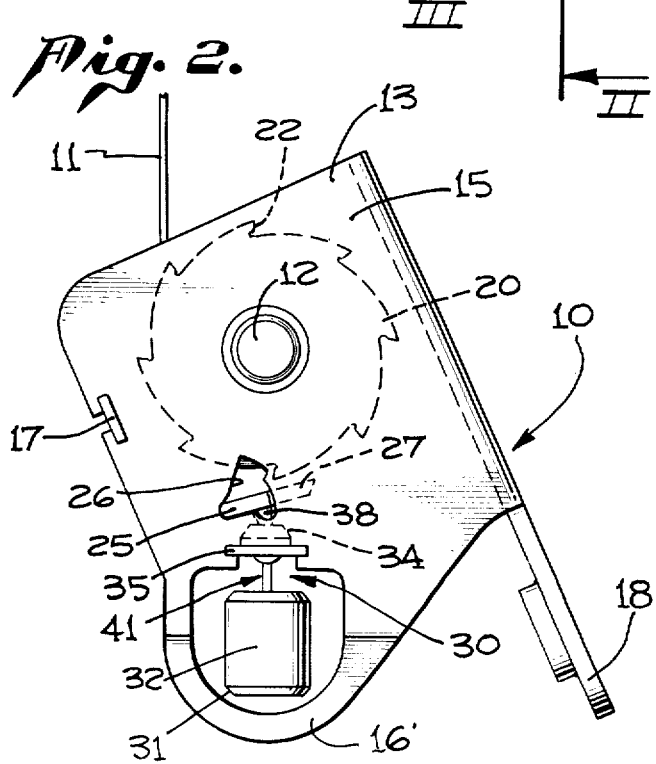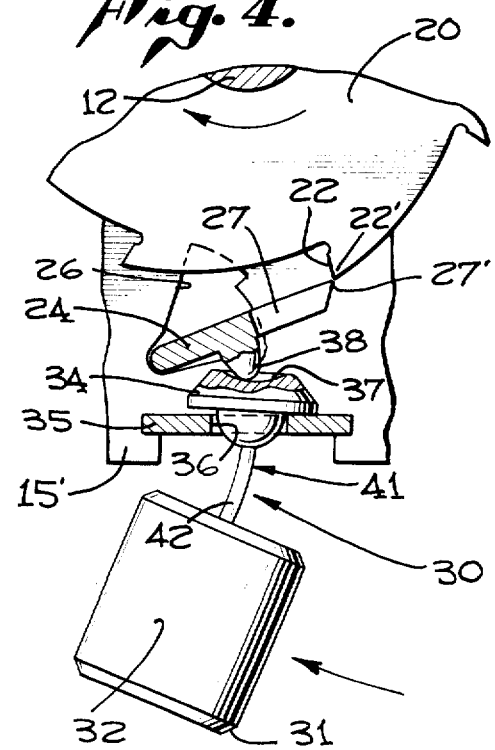

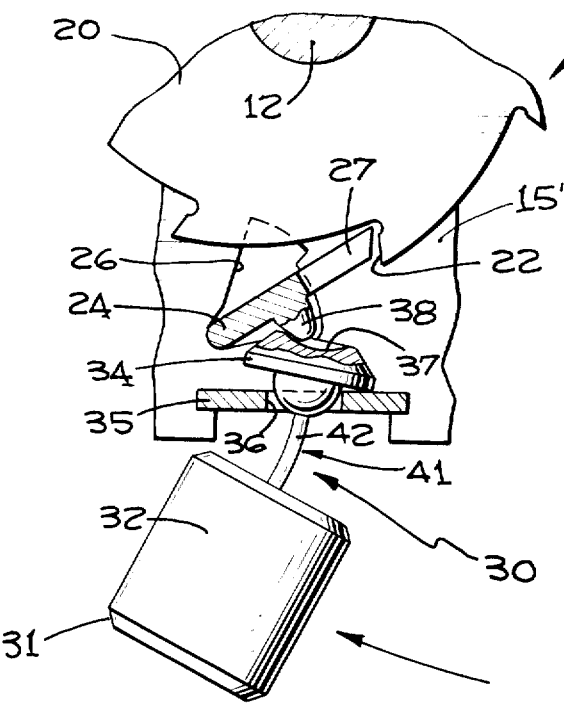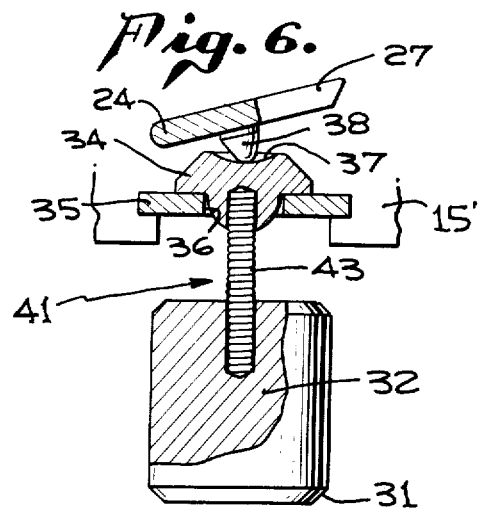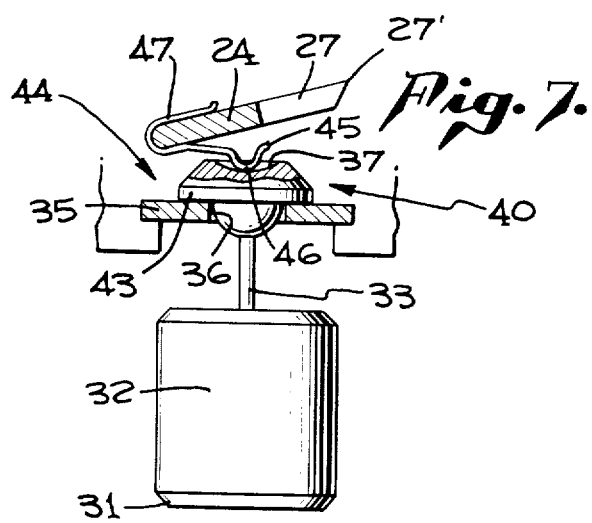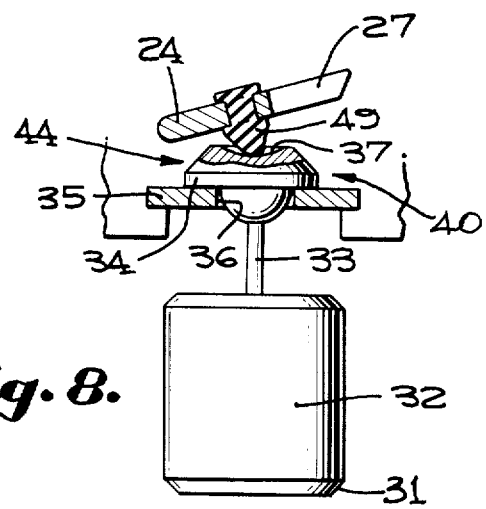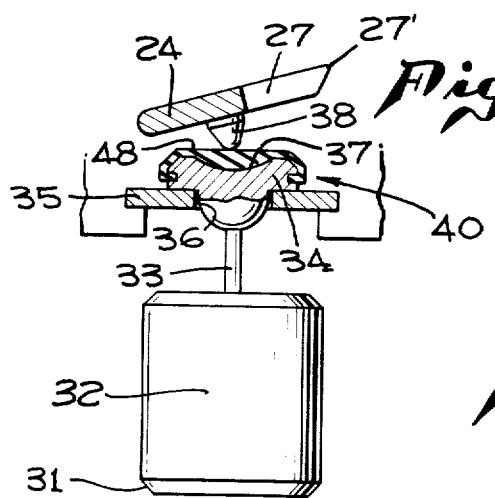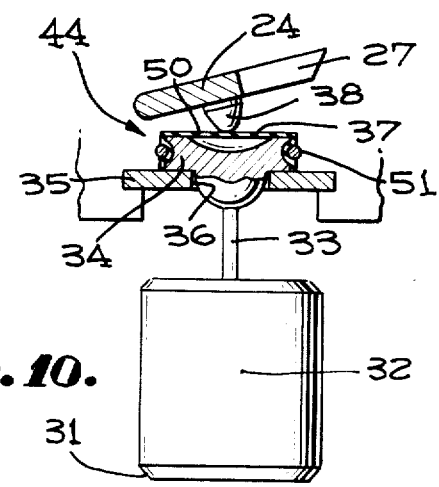

ENERGY STORING SAFETY BELT RETRACTOR

BACKGROUND OF THE INVENTION

This invention relates generally to emergency locking safety belt retractors for use in vehicles for storing a safety belt thereon and for allowing unreeling of the safety belt from the retractor so that the safety belt can be placed about the passenger to restrain him in his seat. More particularly, the invention relates to a retractor which allows uncoiling of the safety belt at all times except during a crash or other emergency when the seat belt locks and prevents further protraction of the belt from the retractor. Basically, this invention relates to an inertia sensitive safety retractor which locks the retractor from further protraction of the belt during a change in inertia of the vehicle; for example, during a crash or sudden deceleration. The locking bar is operated by inertia responsive means including an inertia responsive means including an inertia responsive mass. The present invention includes the provision of adding resilient means between the lock bar and the mass for receiving and storing energy imparted thereto by movement of the mass and for thereby urging the lock bar toward locking engagement with the ratchet wheel through a pawl bounce condition.

At least three basic types of emergency locking retractors have been developed heretofore which are being used commercially. The first type employs a locking pawl which is automatically actuated on a slight retraction of the webbing after an initial protraction of the belt from the retractor. The strap acceleration responsive type automatically locks on a protractive movement of the webbing at an acceleration thereof at a rate above a predetermined rate. In the vehicle inertia responsive type of retractor, the locking mechanism operates in response to change in the inertia of the vehicle in which the mechanism is mounted. In these retractors, depending on the position of the locking pawl and the ratchet wheel when the locking pawl moves to its locking position, a pawl bounce condition can occur. The pawl bounce condition is defined as that which occurs when the locking pawl contacts the ratchet in a tip-to-tip engagement. The dynamics which occur during the pawl bounce condition make it possible for the tip of the locking pawl to engage the tip of the tooth of the ratchet wheel in such a manner that the pawl is rebounded or deflected away from the ratchet wheel rather than moving into its locking engagement with the ratchet wheel. Failure of locking pawl to lock immediately with the ratchet wheel may result in undesirable protraction of the safety belt which increases danger to the vehicle occupant during a crash.

It has been realized that the locking pawl means for emergency locking retractors is needed which, even if pawl bounce occurs, locks assuredly during emergency conditions. There have been prior attempts to solve this problem and they have taken numerous paths. For example, in the patent application to Ziv, Ser. No. 459,539, dated Apr. 10, 1974, entitled "Piggyback Dual Lock Bar," a dual locking pawl means is provided such that one pawl or the other will assuredly lock the retractor upon an emergency condition experienced by the vehicle. There have been other numerous attempts to overcome the problems of pawl bounce, but it is believed that none of these prior attempts have included mechanisms having a construction or mode of operation as contemplated for the within invention.

SUMMARY OF THE INVENTION

It is, therefore, the primary object of the present invention to eliminate the problems associated with pawl bounce so that the retractor will assuredly lock during emergency conditions. Another object of the invention is to accomplish the defeat of the dilatorious effects of the pawl bounce condition using the minimum parts. A further object is to provide elimination of the dangerous effects of the pawl bounce condition in an extremely reliable manner so that the occupants of the vehicle will not be injured if pawl bounce would occur. Still another object of the instant invention is to provide an antipawl bounce mechanism which is easily adapted from existing emergency locking safety belt retractors.

Basically, a positive locking mechanism for a seat belt is provided which locks the retractor against further protractive movement of the belt when the vehicle, upon which the retractor is mounted, undergoes a change in inertia during a crash or other sudden deceleration. The mechanism includes a ratchet wheel with teeth thereon and a locking bar which engages the ratchet wheel on being actuated by the locking mechanism to prevent further rotation of the ratchet wheel. The mechanism comprises vehicle inertia responsive means on the retractor for sensing changes in the inertia of the vehicle.

Energy storing means between the vehicle inertia responsive means and the lock bar urges the lock bar toward locking engagement with the ratchet wheel through the pawl bounce condition when the lock bar initially bounces off the tooth of the ratchet wheel before attaining a locked engagement with the wheel. Preferably, an actuator means is mounted between the mass and the lock bar for transmitting locking movement to the lock bar upon movement of the mass.

In one embodiment, the energy storing means includes resilient stem connecting the mass to the actuator. The stem means is bendable upon movement of the mass such that it stores energy while being bent so the energy storing means will urge the lock bar toward locking engagement with the ratchet wheel through the pawl bounce condition. The stem means may either be a spring wire connecting the mass with the actuator or it may be a coil spring between them.

In another embodiment, the energy storing means includes resilient means between the actuator and the lock bar for storing energy transmitted between the actuator and the lock bar. The resilient means may include a diaphragm mounted on the actuator for storing energy in the resiliency of the diaphragm, it may include elastomeric material either mounted on the lock bar or mounted on the actuator for storing energy in the compression of the material, or the resilient means may include a spring means mounted on the lock bar for storing energy from the actuator means.

BRIEF DESCRIPTION OF THE DRAWINGS

FIG. 1 is a front view of a preferred exemplary embodiment of an emergency locking safety belt retractor having a preferred embodiment of the improved inertia responsive means of the present invention mounted thereon.

FIG. 2 is a side view of the retractor and inertia responsive means of FIG. 1 taken therein along the plant II—II.

FIG. 3 is a section view of the improvement in inertia responsive means of FIG. 2 taken therein along the plane III—III with the inertia mass 32 mounted on a resilient energy storing stem 41.

FIG. 4 is a cross-sectional view also taken along plane III—III showing the improved inertia responsive means in operation and the locking pawl encountering a pawl bounce condition.

FIG. 5 is a cross-sectional view similar to FIGS. 3 and 4 showing the locking bar pawl fully engaging a following tooth of the ratchet in a completely locked condition.

FIG. 6 is a detail view of a first alternative exemplary embodiment of the improved inertia responsive means wherein the energy storing connection between the mass 32 and the actuator 34 is a coil spring 41.

FIG. 7 is a view similar to FIG. 6 and shows a second alternative embodiment wherein the energy storing means includes a spring 47 mounted on the lock bar.

FIG. 8 is a view similar to FIG. 6 and shows a third alternative embodiment wherein the energy storing means includes elastomeric material 49 mounted on the lock bar 24.

FIG. 9 is a view similar to FIG. 6 showing a fourth alternative embodiment wherein elastomeric material 48 is mounted on the actuator means.

FIG. 10 is a view similar to FIG. 6 showing a fifth alternative embodiment wherein the energy storing means includes a diaphragm 50 stretched across the actuator means.

DETAILED DESCRIPTION OF THE PREFERRED EMBODIMENT

A positively locking mechanism for a seat belt retractor, which locks the retractor against further protractive movement of the belt when the vehicle, upon which the retractor is mounted, undergoes a change in inertia during a crash or other sudden deceleration, includes a ratchet wheel with teeth thereon and a lock bar which engages the ratchet wheel on being actuated by the locking mechanism to prevent rotation of the ratchet wheel. The positively locking mechanism is a part of a generally conventional retractor 10. Belt 11 which is unwound and rewound to the retractor is wound around a reel which rotates about the axle 12. The axle is mounted for rotation in the frame 13. The frame 13 comprises a base 14 and sidewalls 15, 15'. A cross brace 17 between the respective sidewalls 15, 15' adds additional support to the frame 13. A spring is mounted in the housing 19 for biasing the reel in the counterclockwise or retraction direction as shown in FIG. 2.

The retractor further includes a ratchet wheel with teeth thereon. The ratchet wheel includes ratchet wheel members 20 and 21 with teeth 22 and 23. The retractor further includes a lock bar which engages the ratchet wheel on being actuated by the locking mechanism to prevent rotation of the ratchet wheel. The locking bar 24 has ends 25, 25' which are pivotally mounted in triangularly shaped slots, one of which is shown at 26. The locking bar 24 further comprises locking pawls 27 and 28 which engage the teeth 22 and 23 of the ratchet wheel members 20 and 21 respectively. The locked position is shown specifically in FIG. 5 wherein the pawl 27 is shown securely engaging tooth 22 of the ratchet wheel member 20.

Vehicle inertia responsive means on the retractor senses changes in the inertia of the vehicle. In the exemplary embodiment, the inertia responsive means 30 comprises a pendulum which includes a mass 32. Stem 33 connects the mass 32 with an actuator means 34. The actuator means rests on plate 35 and part of the actuator means 34 and the stem extends through an aperture 36 in the plate 35 for connection with the mass 32.

FIG. 3 generally shows the retractor in a rest position wherein the vehicle upon which the retractor is mounted is not undergoing any sudden changes in inertia. The locking pawl 27 is out of engagement with the ratchet wheel member 20 so that the belt 11 is free for protractive movement as ratchet wheel 20 undergoes clockwise rotation. The locking bar 24 includes a small protrusion 38 which is adapted to fit into a dimple or bowl-like member in the actuator means 34.

During a sudden change in inertia of the vehicle, the pendulum 31 will move from its rest position in FIG. 3 to assume a position more nearly like that in FIG. 5. The movement of the pendulum causes the actuator means 34 to pivot about its periphery and causes the bowl-like member 37 to move upwards against the protrusion 38. The upward movement causes the locking bar 24 to pivot in its triangular slot 26 to engage the ratchet wheel member 20 as shown in FIG. 5.

Depending on the location of the teeth 22, 23 relative to the pawl 27 and 28 during a crash or other sudden deceleration, when the pendulum moves in response to changes in inertia of the vehicle and the seat belt begins its attempted protraction causing clockwise rotation of the ratchet wheel member 20, the tip 27' of the pawl 27 may contact the tip 22' of the tooth 22. In this instance, the resulting force caused by further rotation of the ratchet wheel member 20 causes a condition known as "pawl bounce." Pawl bounce causes the pawl to rotate in a clockwise direction (FIG. 4). Without the invention herein, the pawl bounce opposes the inertia of the pendulum toward the direction where it causes the locking pawl to lock the ratchet wheel and may even cause the pendulum to return to its rest position. Even if the pendulum is at its rest position only briefly, the ratchet wheel member 20 is free to rotate, and in a crash, the occupant is forced against the seat belt with a great amount of force thereby causing extremely rapid rotation of the ratchet wheel member in the clockwise direction. The rapid rotation will continue until the pendulum again swings a sufficient distance to cause the pawl 27 to engage the teeth 22. Even if the ratchet wheel is allowed to revolve through one-half of a revolution, this may be a sufficient revolution to allow the belt to protract a sufficient distance to fail to securely hold the passenger in the vehicle seat. Any loosening of the belt may cause injury if the passenger gains sufficient freedom of movement within the vehicle during a crash.

As is particularly contemplated within the present invention, energy storing means are provided between the vehicle inertia responsive means and the lock bar for urging the lock bar toward locking engagement with the ratchet wheel through the pawl bounce condition when the lock bar initially bounces off the tooth of the ratchet wheel before attaining a locking engagement with the wheel. In the preferred embodiment, the energy storing means comprises the provision of a resilient stem means 41 connecting the mass to the actuator. The resilient stem 41 is elastically bendable such that it stores energy and continues to urge the lock bar toward locking engagement with the ratchet wheel under urging of the swinging mass through the pawl bounce condition. In this exemplary embodiment, the normally inflexible stem of the prior art connecting the mass 32 and the actuator 34 is replaced by energy storage means in the form of resilient stem means 41. The resilient stem means 41 may either be a spring wire 42 with sufficient resiliency to allow bending of the wire while forcing the mass and actuator back to its rest position, or it may comprise a coil spring 43 also resiliently urging the mass to its position shown in FIG. 6.

The spring wire embodiment is discussed in more detail hereinafter and is shown in detail in FIGS. 4 and 5. Upon a change in inertia of a vehicle, the pendulum 31 moves away from the FIG. 3 rest position; for example, in the direction of the arrow in FIG. 4. Normally, the movement of the pendulum 31 would cause the bowl-shaped member 37 to rise up against the protrusion 38 causing the locking bar 24 to pivot in its slot 26 so that locking pawl 27 engages teeth 22 of the ratchet wheel member 20. However, when the pawl bounce condition occurs, the tip 27' of the pawl engages the tip 22' of the tooth and forces the locking bar 24 in a clockwise direction in FIG. 4. Because the stem means 41 in the form of a spring wire 42 is resilient, the energy from the locking bar 24 to the actuator 34 is stored in the resilient stem means 41 instead of being transmitted immediately to the mass 32. By storing this potential energy in the resilient stem means 41, the stem's resiliency continues to urge actuator 43 in an upward direction thereby pushing the locking bar 42 in a counterclockwise direction causing it to engage the following tooth 22 of the ratchet wheel member 20. Because the mass is free to continue moving in the direction of the arrow in FIG. 4, force will be maintained on the locking bar 24. If the resilient stem were a rigid stem, the downward movement of the lock bar in the pawl bounce condition might cause the mass to slow greatly or to entirely stop thereby momentarily stopping force from the actuator to the lock bar and thereby delaying locking of the locking pawl with the ratchet wheel teeth. Referring now to FIG. 5, the resilient stem means 41 in the form of spring wire 42 has given up some of its stored potential energy in forcing the lock bar 24 into engagement with the tooth 22.

Thereafter, if the pendulum returns to its rest position, the force from the belt urging the ratchet wheel member 20 in a clockwise direction will hold the locking pawl 27 against the tooth 22 so that the retractor is blocked from protraction of the belt.

In FIG. 6, the resilient stem assumes a different embodiment by replacing the spring wire with a coil spring 43. The coil spring 43 operates essentially in the same manner as the spring wire 42 in the previous embodiment. The coil spring serves to store potential energy and urge the actuator means upward against the locking bar when the mass is not in its rest position.

In other embodiments of the invention, the energy storing means includes resilient means between the actuator and the lock bar for storing energy transmitted between the actuator and the lock bar. In one such embodiment, the resilient means 44 includes lock bar spring means 45 mounted on the lock bar to store energy from the actuator means 34. In this particular embodiment, the lock bar spring means is a leaf spring with a curved portion 46 which serves the same function as protrusion 38; that is, it extends into the bowl-shaped member 37 so that when the actuator means 34 moves upward, it will force the locking bar to rotate in a counterclockwise direction through application of the force through the leaf spring 45. In the preferred embodiment, the leaf spring 45 is bent around the edge of the locking bar 24 and because it is resilient, it tends to grip the locking bar 24 so that it will not slide therefrom. The spring could also be attached to the locking bar 24 in other manners; as, for example, by mechanical fastening means or welding or the like.

During the pawl bounce condition, the locking bar 24 would tend to rotate in a clockwise rotation in FIG. 7. This would cause bending of the leaf spring 45 toward the locking bar 24 and causes a storage of energy in the resiliency of the spring. In the pawl bounce condition, it is to be recognized that the mass 32 would be in a position other than that shown in FIG. 7, and were it not for the resiliency in the spring, the pawl bounce would tend to rotate the mass 32 back to its rest position. However, the resiliency of the spring stores the energy and allows the continued application of force from the actuator means to the locking bar.

In another embodiment, the resilient means includes elastomeric material interposed between the actuator and the lock bar for storing energy in the compression of the material. In one exemplary embodiment, the elastomeric material is attached to the actuator means, and in another embodiment the elastomeric material is attached to the lock bar. The first of these embodiments is shown in its preferred form in FIG. 9 wherein elastomeric material 48 is shown filling the bowl-like member 37 on the actuator 34. The elastomeric material functions to absorb the force transmitted during the pawl bounce condition from the lock bar 24 through protrusion 38 to the actuator 34. The energy is stored by compression of the elastomeric material, and the force caused by the elastomeric material returning to its original FIG. 9 shape forces the locking bar 24 into its tooth engaging position when the pendulum is in its non-rest position during a crash.

The elastomeric material could also be attached to the lock bar, as shown in an exemplary embodiment in FIG. 8. In the exemplary embodiment, the elastomeric material comprises a rivet 49 of elastomeric material passing through the lock bar and having an end assuming the same configuration as the protrusion 38 in other exemplary embodiments. The rivet 49 rests in the bowl-shaped portion 37 and absorbs the forces transmitted from the lock bar to the actuator during pawl bounce conditions in a similar manner as the elastomeric material absorbs the force in FIG. 9.

In still another exemplary embodiment, the resilient means includes diaphragm means mounted on said actuator means for storing energy in the resiliency of the diaphragm. In this exemplary embodiment, the diaphragm means 50 is stretched across the bowl-like member 37 and is secured in place by a retaining ring 51 which maintains the diaphragm in a taut condition. During the pawl bounce condition, the locking bar 24 rotates in the clockwise direction causing the protrusion 38 to move downward against the diaphragm 50. It should be noted that as with previous embodiments, the pawl bounce condition would occur when the mass 32 is in a position other than that shown in the respective figures. Consequently, the actuator means 34 would have pivoted upward and, therefore, the pawl bounce would cause the protrusion 38 push downward on the diaphragm 50. Energy is stored in the resiliency of the diaphragm and is returned to the locking bar while the mass 32 is at a non-rest position.

Thus, a device has been shown which meets the aforementioned objects and essentially eliminates the dangers of pawl bounce in a retractor mechanism. The device is relatively inexpensive to mount in the retractor and is extremely reliable.

SUMMARY OF DESCRIPTION

Therefore, an improved inertia responsive means for use in an emergency locking safety belt retractor 10 having a locking bar 24 operated by inertia responsive means 30, including an inertia responsive mass 32, for locking with teeth 22, 23 of the ratchet wheel 20, 21 associated with a belt winding reel of the retractor is provided. The improved inertia responsive means comprises the provision of energy storage means in force transmitting relationship between the lock bar and the mass for receiving and storing energy imparted thereto by movement of the mass and for thereby urging the lock bar toward locking engagement with the ratchet wheel through a pawl bounce condition wherein the lock bar initially bounces off the tooth of the wheel before attaining a locking engagement with the wheel. Actuator means 34 are provided between the mass and the lock bar for transmitting locking movement to the lock bar upon movement of the mass. The energy storing means may take several forms. In one embodiment, the energy storing means includes resilient stem means 41 connecting the mass to the actuator and being bendable upon movement of the mass such that it stores energy while being bent toward the lock bar toward locking engagement with the ratchet wheel through the pawl bounce condition. The resilient stem means may comprise a spring wire 42 connecting the mass with the actuator, or it may comprise a coil spring 43 connecting the mass with the actuator. In another embodiment, the energy storing means includes resilient means 44 between the actuator means and the lock bar for storing energy transmitted between the actuator and the lock bar. The resilient means may take several different forms. In one form, the resilient means includes diaphragm means 50 mounted on the actuator for storing energy in the resiliency of the diaphragm. In another form, the resilient means includes elastomeric material 48 interposed between the actuator and the lock bar for storing energy in the compression of the material. The elastomeric material may either be attached to the actuator or it may take the form of a rivet 49 being attached to the lock bar. The resilient means may further take the form of being a lock bar spring means 45 mounted on the lock bar to store energy from the actuator means.

We claim:

1. A positively locking mechanism for a seat belt retractor, which locks the retractor against further protractive movement of the belt when the vehicle upon which the retractor is mounted undergoes a change in inertia during a crash or other sudden deceleration, including a ratchet wheel with teeth thereon and a lock bar which engages the ratchet wheel on being actuated by the locking mechanism to prevent rotation of the ratchet wheel, said mechanism comprising:
   a. vehicle inertia responsive means on said retractor for sensing changes in the inertia of the vehicles; and
   b. energy storing means in force transmitting relationship between said vehicle inertia responsive means and said lock bar for receiving and storing energy imparted thereto by movement of the vehicle inertia responsive means and for urging said lock bar toward locking engagement with said ratchet wheel through a pawl bounce condition when said lock bar initially bounces off a tooth of said ratchet wheel before attaining a locking engagement with said wheel.

2. The retractor mechanism of claim 1 wherein said vehicle inertia responsive means comprises a mass mounted on the retractor movable in response to changes in the inertia of the vehicle and actuator means between said mass and said lock bar for transmitting locking movement to said lock bar upon movement of said mass, said energy storing means including resilient stem means connecting said mass to said actuator, said stem means being elastically bendable upon movement of said mass such that it stores energy while being bent so that the energy storing means will urge said lock bar toward locking engagement with said ratchet wheel through the pawl bounce condition.

3. The retractor mechanism of claim 2 wherein said resilient stem means comprises a spring wire connecting said mass with said actuator.

4. The retractor mechanism of claim 2 wherein said resilient stem means comprises a coil spring connecting said mass with said actuator.

5. The retractor mechanism of claim 1 wherein said vehicle inertia responsive means comprises a mass mounted on the retractor movable in response to changes in inertia of the vehicle and actuator means between said mass and said lock bar for transmitting locking movement to said lock bar upon movement of the mass, said energy storing means including resilient means between said actuator means and said lock bar for storing energy transmitted between said actuator and said lock bar.

6. The retractor mechanism of claim 5 wherein said resilient means includes diaphragm means mounted on said actuator means for storing energy in the resiliency of the diaphragm.

7. The retractor mechanism of claim 5 wherein said resilient means includes elastomeric material interposed between said actuator and said lock bar for storing the energy in the compression of the material.

8. The retractor mechanism of claim 7 wherein said elastomeric material is attached to said actuator.

9. The retractor mechanism of claim 7 wherein said elastomeric material is attached to said lock bar.

10. The retractor mechanism of claim 5 wherein said resilient means includes lock bar spring means mounted on said lock bar to store energy from said actuator means.

11. In an emergency locking safety belt retractor having a locking bar operated by inertia responsive means, including an inertia responsive mass, for locking with teeth of the ratchet wheel associated with a belt winding reel of the retractor, the improvement in inertia responsive means comprising the provision of:
   energy storage means in force transmitting relation between said lock bar and said mass for receiving and storing energy imparted thereto by movement of said mass and for thereby urging said lock bar toward locking engagement with said ratchet wheel through a pawl bounce condition wherein said lock bar initially bounces off the tooth of said wheel before attaining a locking engagement with said wheel.

12. The improved inertia responsive means of claim 11 further including the provision of:

actuator means between said mass and said lock bar for transmitting locking movement to said lock bar upon movement of said mass, said energy storing means including resilient stem means connecting said mass to said actuator, said stem means being elastically bendable upon movement of said mass such that it stores energy while being bent to urge said lock bar toward locking engagement with said ratchet wheel through the pawl bounce condition.

13. In the improved inertia responsive means of claim 12, the improvement further comprising the provision of:

said resilient stem means comprising a spring wire connecting said mass with said actuator.

14. In the improved inertia responsive means of claim 12, the improvement further comprising the provision of:

said resilient stem means comprising a coil spring connecting said mass with said actuator.

15. In the improved inertia responsive means of claim 11, the improvement further comprising the provision of:

actuator means between said mass and said lock bar for transmitting locking movement to said lock bar upon movement of said mass, said energy storing means including resilient means between said actuator means and said lock for storing energy transmitted between said actuator and said lock bar.

16. In the improved inertia responsive means of claim 15, the improvement further comprising the provision of:

said resilient means including diaphragm means mounted on said actuator means for storing energy in the resiliency of the diaphragm.

17. In the improved inertia responsive means of claim 15, the improvement further comprising the provision of:

said resilient means including elastomeric material interposed between said actuator and said lock bar for storing energy in the compression of the material.

18. In the improved inertia responsive means of claim 17, the improvement further comprising the provision of:

said elastomeric material being attached to said actuator.

19. In the improved inertia responsive means of claim 17, the improvement further comprising the provision of:

said elastomeric material being attached to said lock bar.

20. In the improved inertia responsive means of claim 15, the improvement further comprising the provision of:

said resilient means including lock bar spring means mounted on said lock bar to store energy in the resiliency of said spring means.

* * * * *